July 1, 1924.  
M. HÖCHSTÄDTER  
MEANS FOR INDICATING AND DISCONNECTING DEFECTIVE BRANCHES FROM ELECTRIC CURRENT NETWORKS  
Filed March 30, 1921

1,499,368

WITNESSES  
Oliver W. Holmes

INVENTOR  
Martin Höchstädter  
BY  
Knight Bro.  
ATTORNEYS

Patented July 1, 1924.

1,499,368

UNITED STATES PATENT OFFICE.

MARTIN HÖCHSTÄDTER, OF 'S GRAVENHAGE, NETHERLANDS, ASSIGNOR TO N. V. LYN-PROTECTIE, OF THE HAGUE, NETHERLANDS, A DUTCH CORPORATION.

MEANS FOR INDICATING AND DISCONNECTING DEFECTIVE BRANCHES FROM ELECTRIC-CURRENT NETWORKS.

Application filed March 30, 1921. Serial No. 457,108.

*To all whom it may concern:*

Be it known that I, MARTIN HÖCHSTÄDTER, a German citizen, residing at 157 Stationsweg, 's Gravenhage, Netherlands, have invented certain new and useful Improvements in Means for Indicating and Disconnecting Defective Branches from Electric-Current Networks, for which I have filed applications for patent in Germany on April 8th, 1914; England on August 9th, 1915; Hungary on August 2nd, 1915; Norway on July 10th, 1915; Austria on October 12th, 1914; Sweden on October 27th, 1914; Switzerland on October 15th, 1914; Belgium on November 5th, 1914; Denmark on October 26th, 1914; France on November 4th, 1914; Italy on October 29th, 1914; Holland on October 27th, 1914; Spain on November 5th, 1914; Poland on June 5th, 1920; and Czechoslovakia on January 31st, 1920, and of which the following is a specification, the particular novel features of my invention being pointed out in the claims.

My invention relates to electric mains, under-ground cables or over-head transmission lines, and has for its object to increase the safety of these lines against interruptions from injuries by automatically causing the operation either of signals at the terminals of the line section within which the injured portion of the line is located or by automatically disconnecting from the network the defective portion only, in case its insulation has become defective from mechanical or electrical causes. The principal object of my invention is to bring the protecting device into action even at times when the faults leading to leakages or breakdowns are in the incipient state. The ends to be accomplished by this invention are of great importance in the arrangement of the distributing lines of large central stations by which extended transmission systems are supplied, because by my improvement, faulty portions may instantaneously be eliminated before high frequency or excess voltage waves are able to spread from the point where they are generated to adjacent portions of the system and before these initial disturbances have developed into a short circuit or similar defects. In case of large power transmission systems, the cutting out of short circuits when once fully developed is very difficult and in some cases almost impossible.

According to my invention, the sudden increases in potential or the travelling waves produced thereby, which may issue from the spot where the defect develops, are used for indicating this defect or, is desired, for causing the cutting out of the section within which the fault has occurred.

The present application deals in particular with the use of divided conductors and of gap safety devices cross-connected between them. The idea underlying this invention is to provide the section of an electric distribution-system with two conductors connected at both section ends for each phase, so that during normal operation of the system including that section the potential in the two co-ordinate conductors is substantially the same. These two conductors may be physically combined into one cable insulated from each other or may also be arranged as separate conductors running parallel to each other. Now the only time when an appreciable potential difference between these two conductors will exist is in case of a disturbance in this section giving rise to transient phenomena as for instance high frequency oscillations or travelling waves. Of course these potential rises tend to equalize and disappear at the section ends where the two co-ordinate conductors are connected with each other, but to use these transient phenomena according to this invention they are delayed near the section ends by providing choking coils or similar devices in combination with spark gaps between the two branch conductors in such manner, that the equalization of the transient voltages between the two branch conductors must partly occur through these spark gaps. Any apparatus suitable and well known in the art may be actuated by the ignited air gaps for either indicating the fault or for cutting off the section affected by the fault.

In the accompanying drawings I have illustrated the manner in which my invention may be reduced to practice without limiting however, the invention to the exact details shown.

In these drawings:—

Figure 1:
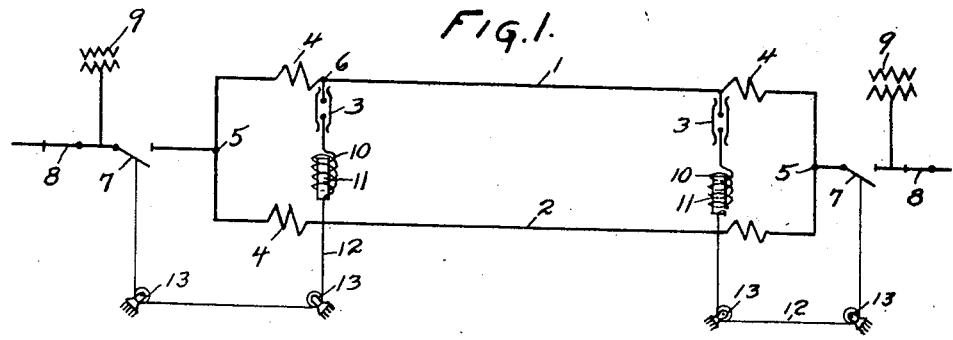
Fig. 1 represents one modification according to which the current flowing through the spark gap may operate the switches.

In Fig. 1 a line section is shown in which the conductor of each phase is divided into branch conductors 1 and 2. Only one phase is shown in the diagram. The conductor may be manufactured or laid out in any suitable manner, for instance in case of underground cables it may consist of two concentric parts insulated from each other or of one strand with one or more insulated wires, or the co-ordinated conductors may be contained in two different underground cables operating in parallel. If the branch conductors are united in one strand for each phase the insulation between them may be quite thin with respect to the working pressure because the transient phenomena accompanying a fault in the section last only a very short time and besides the spark gaps act as a means of protection for this insulation.

The ratio of the cross sections of the two branches may be chosen at will. It is, however, preferable as well for underground cables as for over-head lines to use such a construction of the two branch-conductors that each of them has its own electrostatic capacity under working conditions.

The two branch conductors end at the points 6 and are there connected to choking coils 4 and afterwards united at the points 5 from where connection is made to the oil switches 7 of this section. The transformers in the sub-stations at the section-ends are shown at 9, 9 and at 8, 8 are shown the oil-switches of the adjoining sections which may be constructed in the same way as the section shown. At the section-ends between the points 6—6 a gap safety device 3 is provided which responds to the transient phenomena set up in the section by a fault and actuates the oil switches 7 by any disconnecting means already known in the art, such as is for instance shown and described in my copending application Serial No. 399,388 filed July 27th, 1920. This form is shown in Fig. 1 of the present application.

In the connection between conductors 1 and 2 in which spark gap 3 is located a relay is inserted comprising the coil 10 and the armature 11. Armature 11 is connected by suitable means, for instance by a cord 12 passing over rollers 13—13, to oil switch 7 such that when spark gap 3 breaks down and current flows through relay coil 10 its armature 11 is actuated and opens switch 7 as shown.

The devices 3 consist preferably of spark gaps working either in air or in vacuum, or of any other device of the percussion type allowing discharge above a certain predetermined voltage. The transient phenomena set up by a fault produce an instantaneous discharge on both sides of the section concerned because the choking coils offer a considerable resistance to these phenomena in spite of being practically negligible as a resistance for the operating frequency.

Figure 2:
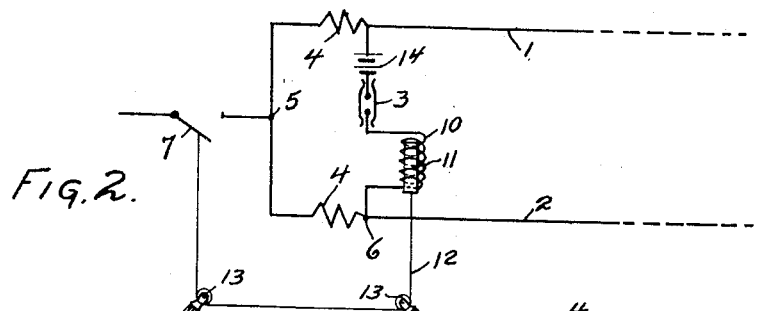
Figs. 2 and 3 represent still different forms in which the actuation of the switches may be accomplished.

The discharge at the devices 3 lasts such a short time that the discharge current itself may be unable to bring about the disconnection of the oil-switches, viz, to work directly upon the tripping coils of these switches. Therefore the transient discharge is only used for igniting purposes, the ignited devices 3 allowing a current to flow, which is supplied for instance by an auxiliary source of current and is strong enough to actuate the tripping coils of the switches. This modification is shown in Fig. 2 in which similar reference letters indicate similar elements such as are shown in Fig. 1, the difference being however that in the circuit containing spark gap 3 and relay 10, a battery 14 is inserted which furnishes current to the local circuit: battery 14—spark gap 3—relay coil 10—choking coils 4—4—battery, by which the coil 10 is energized and effects the cutting out of switch 7 in the manner described before. This disconnecting current may also automatically be produced by the working current flowing through the main 1, 2 for instance according to the method disclosed in my U. S. applications Serial No. 867,683 and Serial No. 867,684 both filed October 20th, 1914 entitled: "System for protecting electric current nets." It is preferable to provide carbon electrodes in the gap devices 3 in order to facilitate ignition and the establishment of the arc of the auxiliary tripping current.

In order to secure a perfectly selective working of the system, that is to say to avoid undesired disconnection of adjacent sections and disconnections by switching-in and switching-off manipulations in the stations it is advisable to adapt the reactance of the choking coils 4 in such a way to the impedance of the two branch conductors 1 and 2 for high-frequency that the two branches between the points 5 of a section are balanced for such transients originating outside of the section and passing through same.

The manner of working of the whole arrangement has been shown above and it has been made clear that the incipient fault and its accompanying transient phenomena are used to bring about the purpose of this invention. Therefore the following stages of the fault will either be prevented by quick disconnection or, if they occur, they will be of no influence upon the working of the disconnection means. Therefore it does not matter with regard to the working of this system whether the insulation between the two branch conductors subsequently breaks down also. This insulation therefore can be chosen rather thin with regard to the working pressure of the line and must only be made strong enough to allow of the setting up of the transients by faults.

Figure 3:
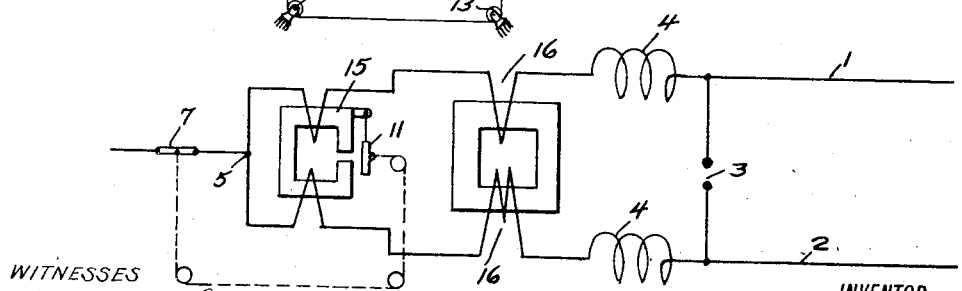

It may further be stated that the choking coils 4 may as well be adapted and dimensioned to produce also upon the normal working current of the line a certain choking effect of sufficient value to give rise to a certain appreciable voltage drop relative to the current carried by the section. Of course, the amount of this drop must be sufficient to supply current across the ignited spark gaps 3 until the oil switches 7 have operated, but on the other side this amount of drop of voltage must not exceed certain limits from the economical standpoint of the power transmission and in view of the fact that the condition created thereby even in case of high overloads shall not be sufficient cause of itself to produce a break at the spark gaps 3. This modification is shown in Fig. 3. In this figure 1, 2 indicate the two conductors 4, 4 the choking coils described before, and 3 the spark gap inserted between the two conductors 1 and 2. 16—16 represents a transformer for supplying the local current necessary for operating the relay by way of the broken down spark gap. 15 represents a differential relay actuated by the local current flowing through the spark gap 3 and over choking coils 4, 4, the action of this relay being such that when the local current flows, the armature 11 is actuated and brings about the cutting out of switch 7 in the manner similar to that described hereinbefore.

I claim:—

1. In an electrical distributing system, a line section comprising two conductors having their respective ends jointly connected to the respective section terminals, means for disconnecting said line section from the system at said terminals, and gap safety devices connected between said conductors adjacent to said section terminals and being responsive to abnormal potential differences between said conductors and an operative connection between said gap safety devices and said disconnecting means, causing the latter to operate on response of said gap safety devices.

2. In an electrical distributing system, a line section comprising two conductors having their respective ends jointly connected to the respective section terminals, means for disconnecting said line section from the system at said terminals, and gap safety devices connected between said conductors adjacent to said section terminals and being responsive to abnormal potential differences between said conductors, and operative connection between said gap safety devices and said disconnecting means, causing the latter to operate on response of said gap safety devices, and reactance means interposed in at least one of said conductors between a section terminal and the gap safety device located adjacent thereto.

In witness whereof, I have hereunto signed my name in the presence of two subscribing witnesses.

MARTIN HÖCHSTÄDTER.